(12) United States Patent
Taniguchi et al.

(10) Patent No.: US 7,475,577 B2
(45) Date of Patent: Jan. 13, 2009

(54) ELECTRIC STEERING LOCK SYSTEM

(75) Inventors: Takeshi Taniguchi, Miyazaki (JP); Toshinari Tezuka, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 11/907,990

(22) Filed: Oct. 19, 2007

(65) Prior Publication Data
US 2008/0105009 A1 May 8, 2008

(30) Foreign Application Priority Data

Nov. 8, 2006 (JP) ............................. 2006-302762
Nov. 8, 2006 (JP) ............................. 2006-302763

(51) Int. Cl.
*B60R 25/02* (2006.01)

(52) U.S. Cl. .......................................... 70/186; 70/252

(58) Field of Classification Search ........... 70/182–186, 70/190, 191, 245–247, 252; 74/492, 493; 307/10.3–10.6; 475/14, 149, 337

See application file for complete search history.

(56) References Cited

U.S. PATENT DOCUMENTS

| 845,103 | A | * | 2/1907 | Ljungstrom | .................. | 475/335 |
|---|---|---|---|---|---|---|
| 1,320,530 | A | * | 11/1919 | Buehler | ........................ | 475/337 |
| 1,496,909 | A | * | 6/1924 | Shapiro | ........................ | 70/185 |
| 1,642,325 | A | * | 9/1927 | Bleoo | ........................... | 70/223 |
| 4,365,525 | A | * | 12/1982 | Imazaike | .................... | 475/337 |
| 4,638,882 | A | * | 1/1987 | Sato | ........................... | 180/287 |
| 4,643,009 | A | * | 2/1987 | Sato | ............................ | 70/252 |
| 5,927,112 | A | * | 7/1999 | Yamashita | ................... | 70/252 |
| 6,095,223 | A | * | 8/2000 | Rossini et al. | ............. | 160/107 |
| 7,296,495 | B2 | * | 11/2007 | Quinn | ......................... | 74/640 |
| 7,303,497 | B1 | * | 12/2007 | Wige | ............................ | 475/1 |
| 2005/0183476 | A1 | * | 8/2005 | Feucht et al. | ................. | 70/186 |
| 2005/0268677 | A1 | * | 12/2005 | Okada et al. | .................. | 70/186 |

FOREIGN PATENT DOCUMENTS

EP 0 187 873 A1 7/1986
JP 63-59903 11/1998

* cited by examiner

*Primary Examiner*—Lloyd A Gall
(74) *Attorney, Agent, or Firm*—Arent Fox LLP

(57) ABSTRACT

An electric steering lock system includes a planetary gear mechanism provided between a rotation member and an electric motor which operate to slide a locking member. The planetary gear mechanism includes: a first sun gear coupled to the electric motor in a relatively non-rotatable manner; a ring gear fixed to a casing and having inner teeth; first planetary gears carried on a first carrier and meshed with the first sun gear and the inner teeth; a second sun gear coupled to the first carrier in a relatively non-rotatable manner; a second sun gear which is carried on a second carrier connected to the rotation member in a relatively non-rotatable manner and which is meshed with the second sun gear and the inner teeth. A shaft has opposite ends coaxially coupled to the first sun gear and the rotation member respectively in a relatively rotatable manner. The first carrier and the second sun gear are supported on the shaft in a relatively rotatable manner. Thus, the planetary gear mechanism can conduct two-staged deceleration while avoiding an increase in the number of components and the size of the planetary gear mechanism.

3 Claims, 8 Drawing Sheets

ELECTRIC STEERING LOCK SYSTEM

BACKGROUND OF THE INVENTION

1. Field of the Invention

The present invention relates to an electric steering lock system comprising: a casing mounted to a steering column; a locking member slidably supported in the casing between a position for engaging the casing with the steering shaft and a position for disengaging the casing from the steering shaft; a rotation member; an electric motor; and a planetary gear mechanism for reducing the rotation speed of the electric motor and transmitting the rotation speed to the rotation member.

2. Description of the Related Art

Such an electric steering lock system is known as disclosed in Japanese Patent Publication No. 63-59903 for example.

However, in the disclosed electric steering lock system, deceleration is conducted only at a single stage by a planetary gear mechanism, leading to a possibility that a sufficient deceleration is not provided for driving a locking member to slide with a sufficient power. Then, it is conceivable that a two-staged deceleration is conducted by the planetary gear mechanism, but this naturally provides an increase in the number and size of components.

SUMMARY OF THE INVENTION

The present invention has been made in view of the above situation, and has an object to provide an electric steering lock system which achieves deceleration at two stages using a planetary gear mechanism while avoiding an increase in the number components and the size of the planetary gear mechanism.

To achieve the above object, according to a first feature of the present invention, there is provided an electric steering lock system comprising: a casing mounted to a steering column; a locking member slidably supported in the casing between a position for engaging the casing with the steering shaft and a position for disengaging the casing from the steering shaft; a rotation member for operating the locking member to slide in response to rotation thereof; an electric motor; and a planetary gear mechanism for reducing rotation speed of the electric motor and transmitting the rotation speed to the rotation member, wherein the planetary gear mechanism includes: a first sun gear coaxially coupled to an output shaft of the electric motor in a relatively non-rotatable manner; a plurality of first planetary gears meshed with the first sun gear; a ring gear which is fixed to the casing and has inner teeth to be meshed with the first planetary gears; a first carrier for rotatably supporting the plurality of the first planetary gears; a second sun gear disposed coaxially with the first sun gear and coupled to the first carrier in a relatively non-rotatable manner; a plurality of second planetary gears meshed with the second sun gear and the inner teeth; a second carrier which rotatably supports the second planetary gears and is coupled to one end of the rotation member in a relatively non-rotatable manner; and a shaft whose opposite ends are coaxially coupled to the first sun gear and the rotation member respectively in a relatively rotatable manner, the first carrier and the second sun gear being supported on the shaft in a relatively rotatable manner.

With the arrangement of the first feature, a first deceleration is conducted between the first sun gear and the first carrier, and a second deceleration is conducted between the second sun gear non-relatively rotatable with the first carrier and the second carrier, so that rotation power of the electric motor is sufficiently reduced and transmitted to the rotation member, thereby driving the locking member to slide with a sufficient power. Also, the ring gear of the planetary gear mechanism is a single component commonly used in the first and second decelerations, thereby avoiding an increase in the number of components and the size of the planetary gear mechanism.

According to a second feature of the present invention, in addition to the first feature, the system further comprises: an ignition switch which is housed in the casing and changes switching modes in response to rotation of the rotation member; and an operation switch which is attached to the casing to issue a control unit housed in the casing to control operation of the electric motor.

With the arrangement of the second feature, the operation of the operation switch controls the operation of the electric motor, so that the locking member is driven between a steering locked state and a steering unlocked state, and also the switching modes of the ignition switch are changed. The deceleration between the electric motor and the rotation member is conducted by the planetary gear mechanism, and the planetary gear mechanism is housed in the casing so that the size of the casing is not increased in the radial direction of the planetary gear mechanism and also is not increased beyond the size of the conventional steering lock system using a mechanical key. Thus, it is possible to use, in the same type of vehicle, either the electric steering lock system having an operation switch and an ignition switch or a conventional steering lock system using a mechanical key.

According to a third feature of the present invention, in addition to the first or second feature, the system further comprises: a control substrate housed in and fixed to the casing; a control unit disposed in the control substrate to control the operation of the electric motor; and a vibration sensor for detecting a vibration generated in the casing in at least one of cases where an engine is operated and where a vehicle is running; and when the vibration sensor detects a vibration, the control unit is prohibited from controlling the electric motor to operate the locking member to slide in a direction to engage with the steering shaft.

With the arrangement of the third feature, the vibration sensor detects a vibration in the casing in at least one of the cases where the engine is operated and where the vehicle is running, and when the vibration sensor detects a vibration, the electric motor is prohibited from operating the locking member to be engaged with a steering shaft. This arrangement provides a fail safe function which prohibits the locking member from sliding when the vehicle is running. Further, the vibration sensor is mounted on the control substrate which is housed in and fixed to the casing and on which also the control unit is mounted, thereby eliminating wiring for inputting a signal indicating a vehicle running state, from outside of the casing, to the control unit to simplify the structure of the electric steering lock system, and facilitating an assembly thereof.

The above-mentioned object, other objects, characteristics, and advantages of the present invention will become apparent from preferred embodiments, which will be described in detail below by reference to the attached drawings.

DESCRIPTION OF THE PREFERRED EMBODIMENTS

Figure 1:
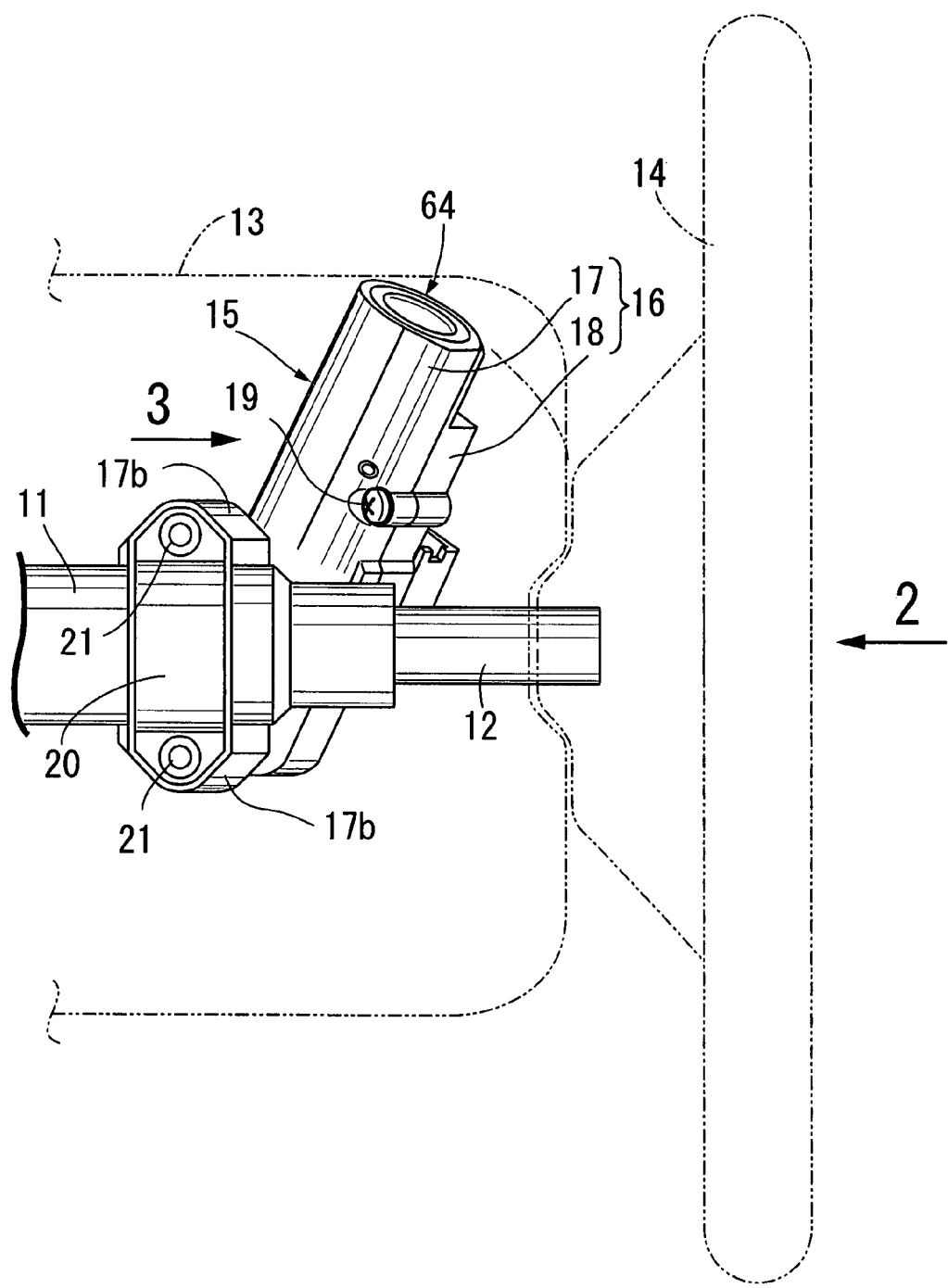
FIG. 1 is a plan view of an electric steering lock system according to an embodiment of the present invention which is mounted to a steering column.
Figure 2:
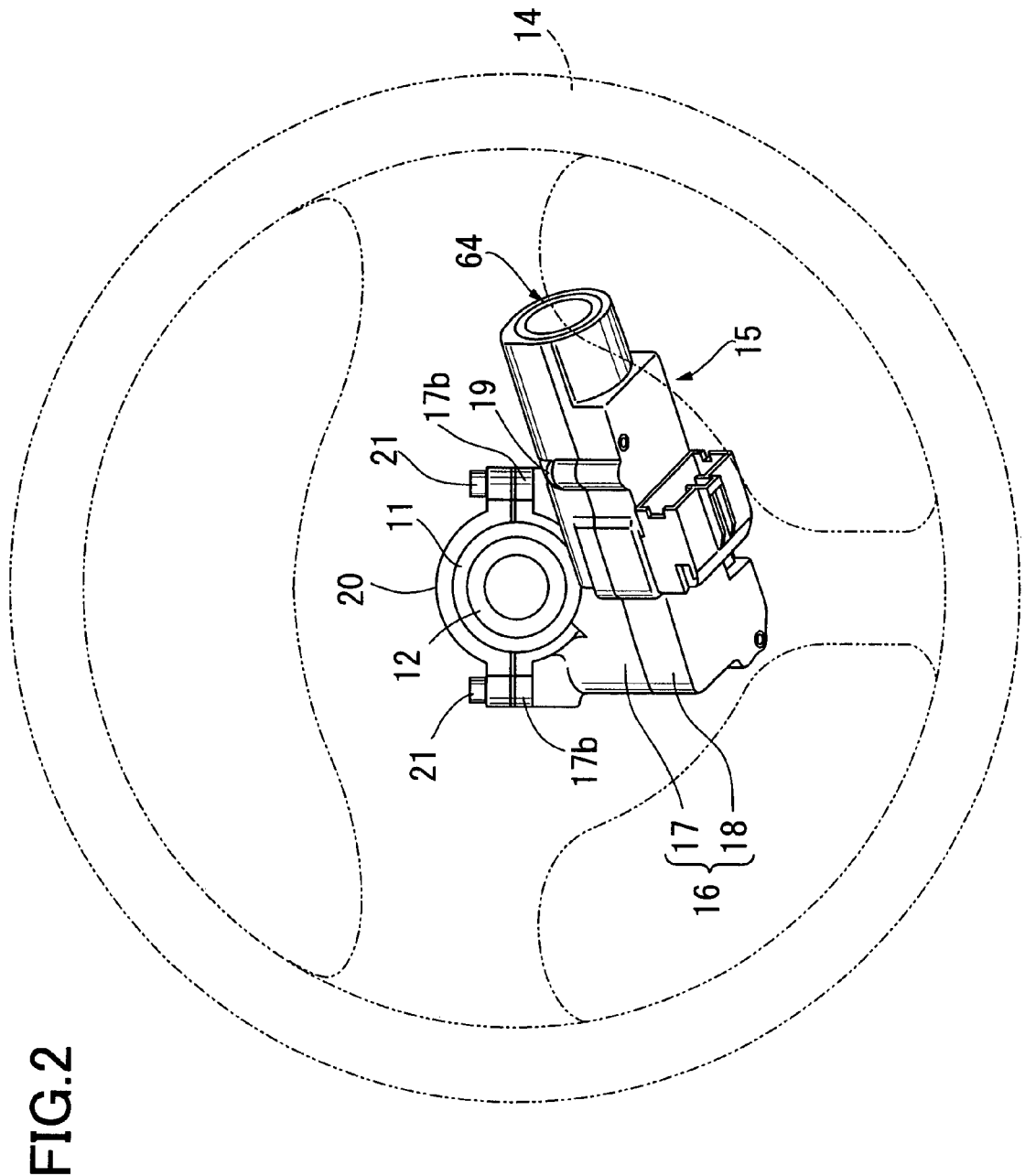
FIG. 2 is a view taken in a direction of an arrow 2 in FIG. 1.

Now, a first embodiment of the present invention will be described below with reference to FIG. 1 to FIG. 7. First, referring to FIGS. 1 and 2, a steering column 11 is fixed to a vehicle body of a vehicle, and a steering shaft 12 passes through the steering column 11. The steering column 11 is covered with a column cover 13. A steering wheel 14 is mounted at one end of the steering shaft 12 projecting out of the column cover 13. An electric steering lock system 15 switches between a state in which a steering by a steering wheel 14 is allowed and a state in which the steering is prevented. The electric steering lock system 15 includes a casing 16 which is mounted to the steering column 11 so as to extend in a direction oblique to the vertical plane including the axis of the steering column 11. The most part of the casing 16 is covered with the column cover 13.

Figure 3:
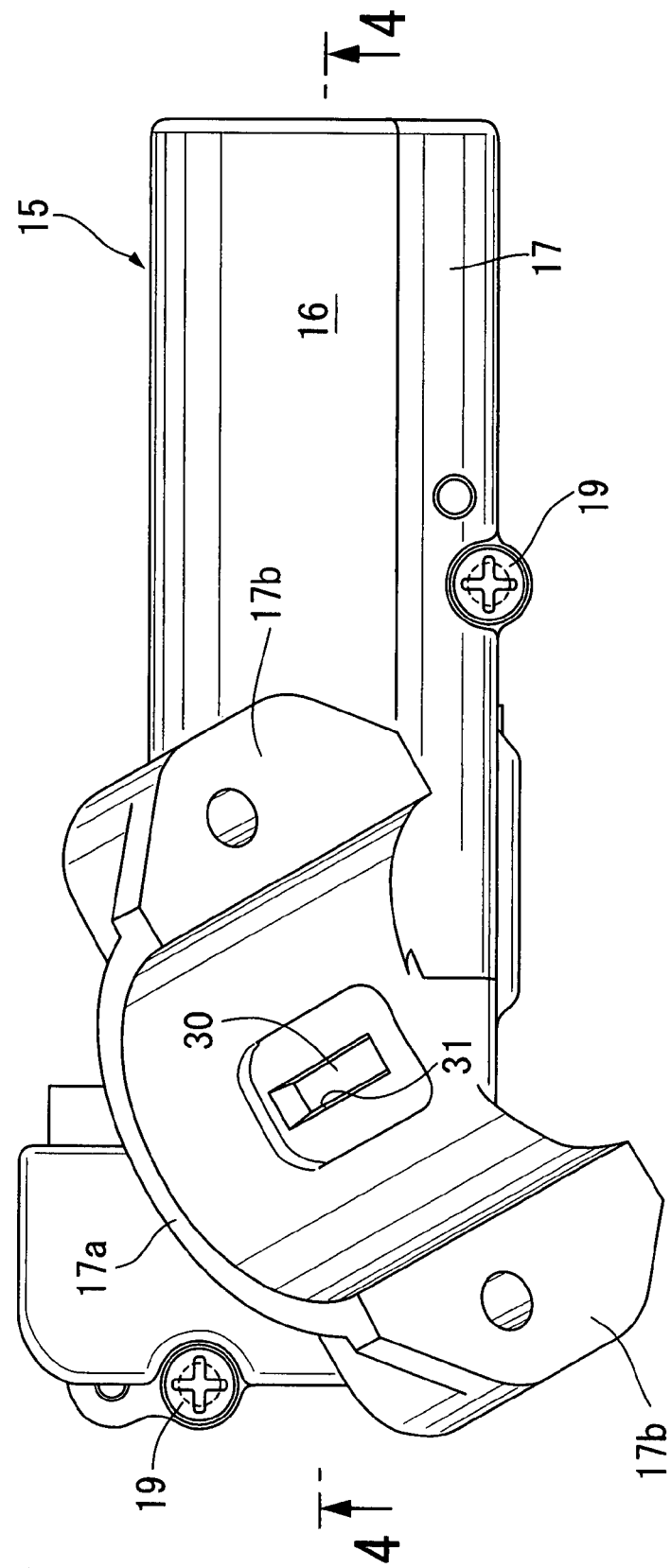
FIG. 3 is a view taken in a direction of an arrow 3 in FIG. 1.
Figure 4:
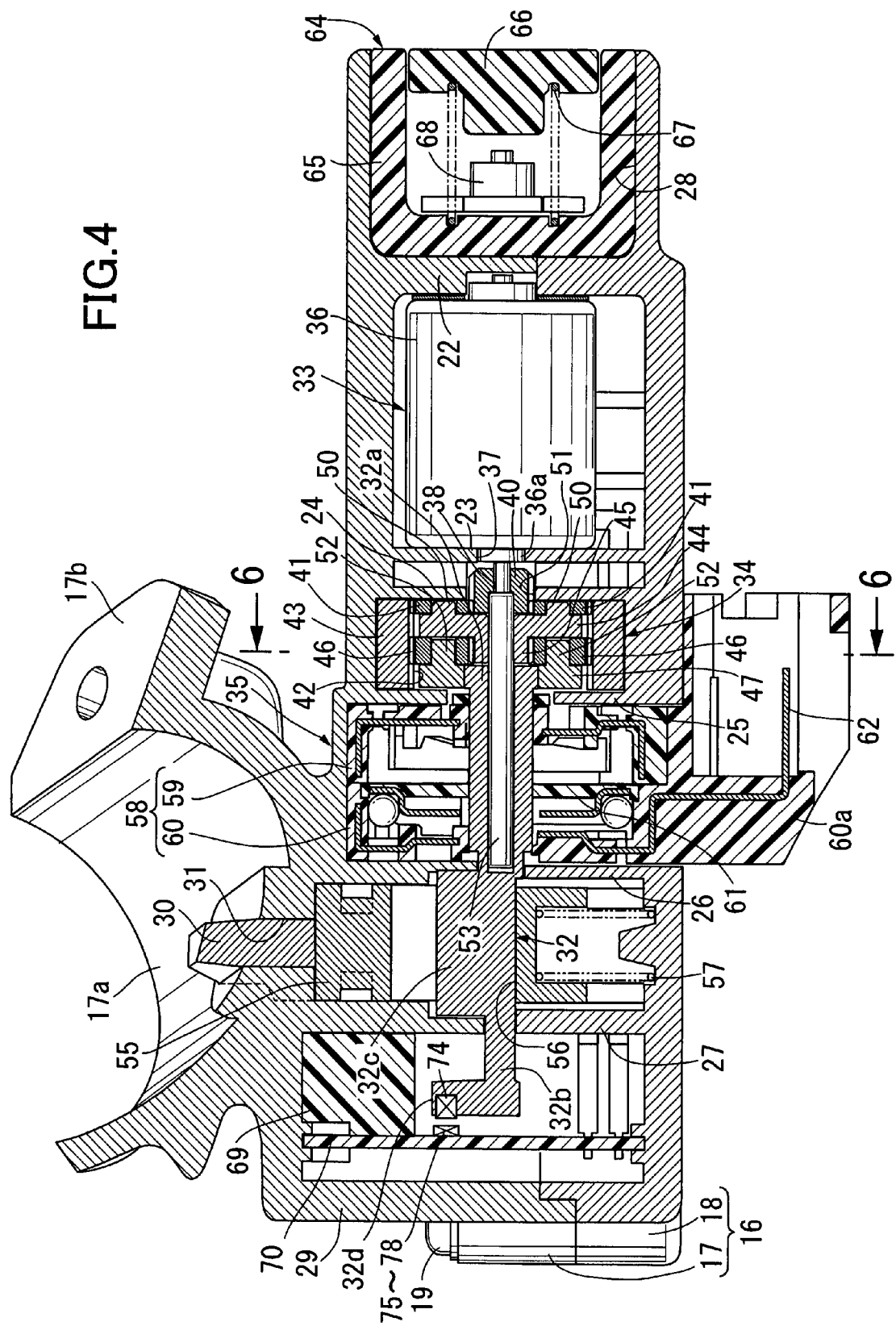
FIG. 4 is a sectional view taken along a line 4-4 in FIG. 3.

Referring to FIG. 3 and FIG. 4 together, the casing 16 includes: a casing main body 17 having a generally U-shaped cross section so as to open to the side opposite to the steering column 11, and a cover 18 having a generally U-shaped cross section so as to open to the casing main body 17 side, the casing main body 17 and the cover 18 being fastened together by a plurality of screw members 19. The casing main body 17 further integrally includes an arcuate mount portion 17a substantially covering a half periphery of the steering column 11, and a pair of flange portions 17b extending outward from opposite ends of the mount portion 17a in the circumferential direction. A circular mount member 20 is formed into an arcuate shape so as to cover the generally entire periphery of the steering column 11 in cooperation with the mount portion 17a. The circular mount member 20 is fastened at opposite ends thereof in the circumferential direction to both the flange portions 17b by bolts 21 respectively, thereby mounting the casing 16 to the steering column 11 with one end thereof directed diagonally rearward rightward in the traveling direction of the vehicle.

The casing 16 has first to sixth bulkheads 22 to 27 which are arranged sequentially from one end of the casing 16 (from the right of FIG. 4) with spaces provided therebetween in the longitudinal direction of the casing 16. The first to sixth bulkheads 22 to 27 are formed in cooperation between the casing main body 17 and the cover 18. The first bulkhead 22 is arranged at a position inwardly spaced from one end of the casing 16. On the one end of the casing 16, the casing main body 17 and the cover 18 cooperate to form a receiving recess 28 which has the first bulkhead 22 as a closing end thereof and is open outwards. The casing main body 17 and the cover 18 also cooperate to form an end wall 29 which closes the other end of the casing 16.

The casing 16 supports a lock plate 30 as a locking member which slides between a position to engage the casing 16 with the steering shaft 12 and a position to disengage the casing 16 from steering shaft 12. A slide hole 31 is provided at a central portion in the circumferential direction of the mount portion 17a of the casing main body 17 of the casing 16 so as to extend along the radial direction of the steering shaft 12. The lock plate 30 is slidably fitted in the slide hole 31.

The casing 16 houses therein a rotation member 32 which operates the lock plate 30 to slide in response to the rotation of the rotation member 32, an electric motor 33, a planetary gear mechanism 34 as a reduction mechanism which reduces rotation speed of the electric motor 33 and transmits the rotation speed to the rotation member 32, and an ignition switch 35 which changes switching modes in response to the rotation of the rotation member 32.

The electric motor 33 includes a motor housing 36 which is housed in and fixed to the casing 16 at a position between the first and second bulkheads 22 and 23. The motor housing 36 has a coaxially projecting portion 36a at its end on the second bulkhead 23 side. The projecting portion 36a passes through a through hole 37 provided in the second bulkhead 23 so that an output shaft 38 of the electric motor 33 protrudes out of the projecting portion 36a.

Figure 5:
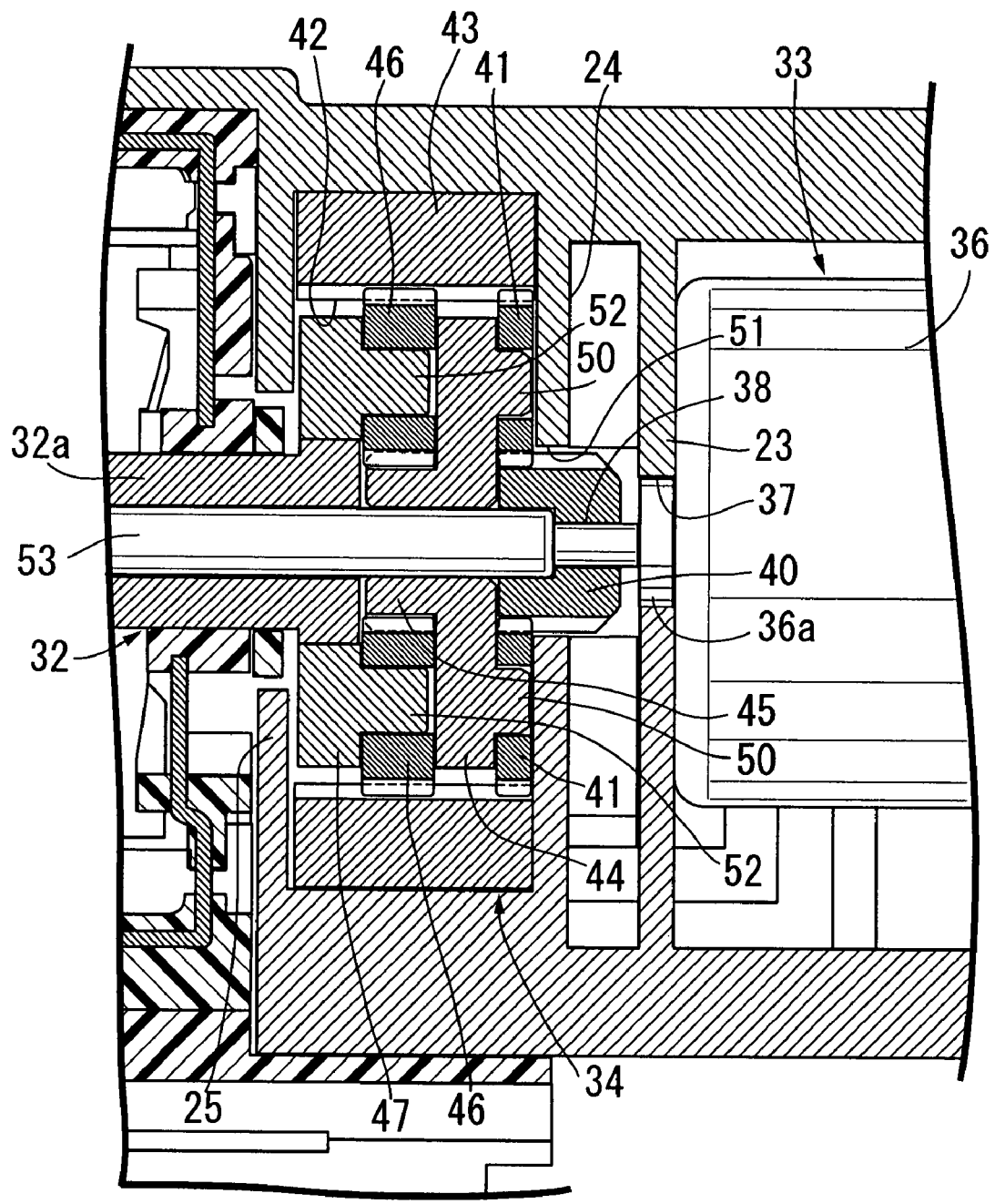
FIG. 5 is an enlarged view of a part around a planetary gear mechanism of FIG. 4.
Figure 6:
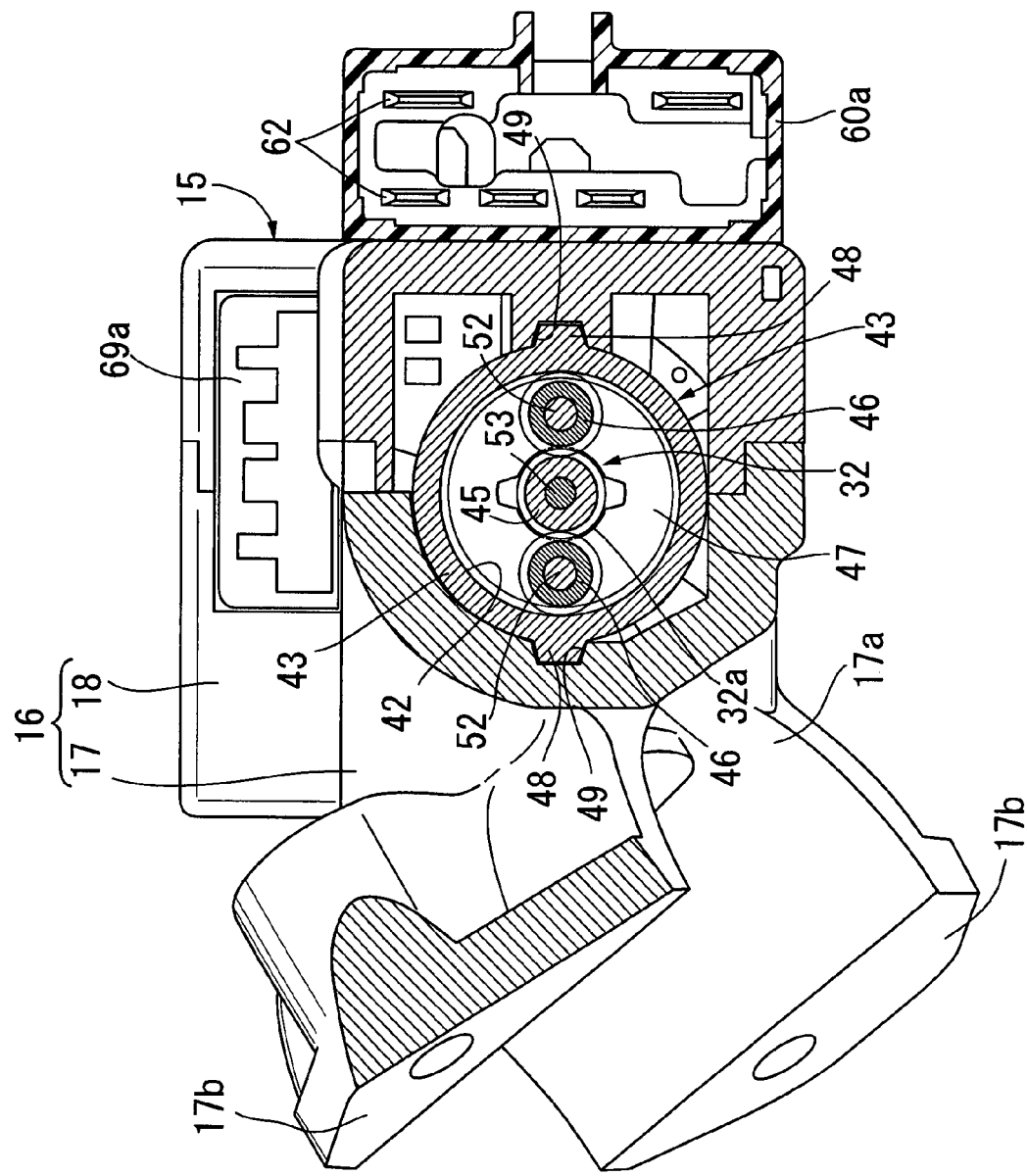
FIG. 6 is a sectional view taken along a line 6-6 in FIG. 4.

Referring to FIG. 5 and FIG. 6, the planetary gear mechanism 34 includes: a first sun gear 40 coaxially coupled to the output shaft 38 of the electric motor 33 in a relatively non-rotatable manner; a plurality of, for example a pair of, first planetary gears 41 meshed with the first sun gear 40; a ring gear 43 which is fixed to the casing 16 and has inner teeth 42 to be meshed with the first planetary gears 41; a first carrier 44 for rotatably supporting the plurality of the first planetary gears 41; a second sun gear 45 disposed coaxially with the first sun gear 40 and connected to the first carrier 44 in a relatively non-rotatable manner; a plurality of, for example a pair of, second planetary gears 46 meshed with the second sun gear 45 and the inner teeth 42; and a second carrier 47 which rotatably supports the second planetary gears 46 and is coupled to one end of the rotation member 32 in a relatively non-rotatable manner.

The ring gear 43 is housed in the casing 16 in a position between the third bulkhead 24 and the fourth bulkhead 25. A pair of engaging projections 48 project out of the outer periphery of the ring gear 43 along a diameter line of the ring gear 43. The engaging projections 48 are engaged with locking recesses 49 which are formed respectively in the inner surfaces of the casing main body 17 and the cover 18 in the casing 16, thereby fixing the planetary gear mechanism 34 to the casing 16.

The first and second carriers 44, 47 are housed in the casing 16 such that the first carrier 44 is arranged on the third bulkhead 24 side and the second carrier 47 is arranged on the fourth bulkhead 25 side, and they are coaxially aligned between the third bulkhead 24 and the fourth bulkhead 25. The pair of first planetary gears 41 are rotatably supported by a pair of first support shafts 50 which are integrally provided in the first carrier 44 so as to project toward the third bulkhead 24. The first sun gear 40 is disposed through a receiving hole 51 provided in the third bulkhead 24. One end of the first sun gear 40 is in sliding contact with the first carrier 44.

A pair of second planetary gears 46 are rotatably supported by a pair of second support shafts 52 which project toward the first carrier 44 and are integrally provided on the second carrier 47. The second sun gear 45 is coaxially and integrally formed with the first carrier 44 so as to be meshed with the second planetary gears 46.

Referring to FIG. 4 again, a slider 55 is housed in the casing 16 at a position between the fifth bulkhead 26 and the sixth bulkhead 27. The slider 55 is coupled to a lock plate 30 which is slidably fitted in the slide hole 31 so that the slider 55 can slide in the sliding direction of the lock plate 30. The slider 55 has an opening 56 through which the rotation member 32 passes.

The rotation member 32 integrally includes a first shaft portion 32a, a second shaft portion 32b and a lift cam portion 32c. The first shaft portion 32a rotatably passes through the fourth and fifth bulkheads 25 and 26. The second shaft portion 32b is coaxial with the first shaft portion 32a, and rotatably passes through the sixth bulkhead 27. The lift cam portion 32c provides connection between the first shaft portion 32a and the second shaft portion 32b, and passes through the opening 56 in the slider 55. A spring 57 is interposed under compression between the cover 18 and the slider 55 in the casing 16. The spring 57 urges the slider 55 to bring the inner surface of the opening 56 into contact with the lift cam portion 32c on the side opposite to the lock plate 30.

Thus, a change of the position of the inner surface of opening 56 which is in contact with the outer periphery of the lift cam portion 32c in response to the rotation of the rotation member 32 causes the lock plate 30 to slide between a position to be engaged with the steering shaft 12 and a position to be disengaged from the steering shaft 12.

In addition, one end of the first shaft portion 32a of the rotation member 32 is connected to the central portion of the second carrier 47 of the planetary gear mechanism 34 in a relatively non-rotatable manner, whereby rotation speed outputted from the electric motor 33 is reduced by the planetary gear mechanism 34, and then transmitted to the rotation member 32.

Further, the first sun gear 40 and the first shaft portion 32a of the rotation member 32 are fitted with the opposite ends of the coaxial shaft 53 respectively in a relatively rotatable manner, so that the shaft 53 supports the first carrier 44 and second sun gear 45 in a relatively rotatable manner. That is, the first carrier 44 and second sun gear 45 are supported in a relatively rotatable manner by the shaft 53 whose opposite ends are coaxially coupled to the first sun gear 40 and the rotation member 32 respectively in a relatively rotatable manner.

An ignition switch 35 is housed in the casing 16 at a position between the fourth bulkhead 25 and the fifth bulkhead 26. The ignition switch 35 had a switch case 58 which includes a first case half 59 on the fourth bulkhead 25 side, and a second case half 60 on the fifth bulkhead 26 side, which are coupled to each other. A movable member 61 is rotatably housed in the switch case 58, and is connected to the first shaft portion 32a of the rotation member 32 in a relatively non-rotatably manner. Therefore, the movable member 61 rotates with the rotation member 32, and the rotation of the movable member 61 changes the switching modes of the ignition switch 35.

The second case half 60 of the switch case 58 has a coupler portion 60a integrally formed therein to project from the lower side wall of the casing 16. A plurality of terminals 62 are arranged in the coupler portion 60a.

An operating portion 64 is disposed in the receiving recess 28 at one end of the casing 16, and includes: a bottomed cylindrical button housing 65 housed in and fixed to the receiving recess 28; a push-button 66 slidably fitted in the button housing 65; a return spring 67 interposed under compression between the closing end of the button housing 65 and the push-button 66; and an operation switch 68 arranged at the closing end of the button housing 65 so that the operation switch 68 is turned on when the push-button 66 is pushed against the spring force of the return spring 67.

A control substrate 70 is housed in the casing 16 at a position between the sixth bulkhead 27 and an end wall 29.

The control substrate 70 is fixed to a supporting member 69 made of synthetic resin. The supporting member 69 has a coupler portion 69a integrally formed therein to project outward from the side portion of the casing 16.

Figure 7:
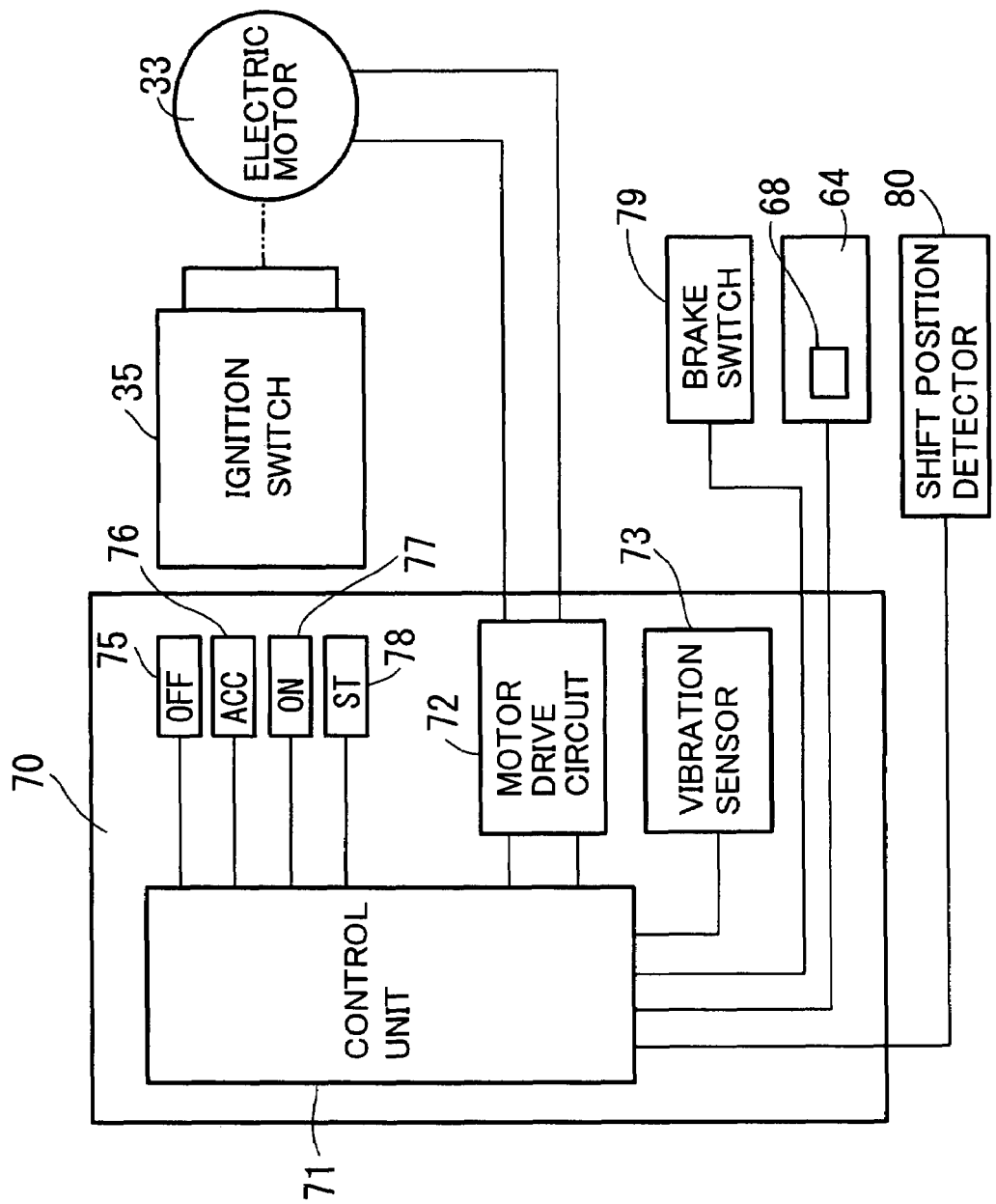
FIG. 7 is a block diagram of a control system of an electric motor.

In FIG. 7, a control unit 71 comprising a microcomputer is mounted on the control substrate 70. The control unit 71 controls the operation of the electric motor 33 in response to a command issued from the operation switch 68.

In addition to the control unit 71, a motor drive circuit 72 is disposed on the control substrate 70 in order to drive the electric motor 33 in response to a signal from the control unit 71. Also, a vibration sensor 73 is mounted on the control substrate 70 in order to detect a vibration generated in the casing 16 in at least one of, both in the present embodiment, cases where the engine is operated and where the vehicle is running.

As clearly shown in FIG. 4, an arm portion 32d is integrally provided at one end, opposed to the control substrate 70, of the second shaft portion 32b of the rotation member 32. The arm portion 32d extends outward from the second shaft portion 32b in the radial direction. A magnet 74 is mounted at the tip end of arm portion 32d so as to face the control substrate 70. Four hall elements 75 to 78 are disposed on the control substrate 70. The hall elements 75 to 78 detect an operation position of the electric motor 33, that is, an OFF (LOCK) position, an ACC position, an ON position, or a ST position, by detecting the position of the magnet 74 in response to the rotation of the rotation member 32 caused by the operation of the electric motor 33.

Inputted to the control unit 71 are signals from the operation switch 68, the vibration sensor 73 and the hall elements 75 to 78, as well as signals from a brake switch 79 which detects a pressing of a brake pedal by a driver of the vehicle, and signals detected by a shift position detector 80 which detects a shift position of a transmission (not shown). The control unit 71 outputs a driving signal which causes the electric motor 33 to operate in response to the inputted signals, which in turn causes the motor drive circuit 72 to operate.

That is, in a state where the shift position detector 80 detects a parking position, and the brake switch 79 detects a pressing of the brake pedal, when a legitimate user who is authorized for operation pushes the push-button 66 of the operating portion 64, the control unit 71 inputs a driving signal to the motor drive circuit 72 in order to cause the electric motor 33 to sequentially pass the OFF (LOCK) position, the ACC position, and the ON position into the ST position. Correspondingly, the ignition switch 35 is turned on; the lock plate 30 slides to the position to be disengaged from the steering shaft 12 into an unlocked state; and after the engine starts, the electric motor 33 reversely operates to the ON position.

However, in a state where the shift position detector 80 detects a parking position, but the brake switch 79 does not detect a pressing of the brake pedal, when the push-button 66 of the operating portion 64 is pushed, the control unit 71 operates the electric motor 33 to move to the ACC position; and when the push-button 66 is further pushed, the electric motor 33 repeats operating through OFF (LOCK) position, ACC position, ON position, OFF (LOCK) position and ACC position into ON position, which prevents the engine from starting. Also, in a state where the shift position detector 80 does not detect a parking position, even when the push-button 66 is pushed, the electric motor 33 never operates.

In a state where the electric motor 33 is at the ON position and the shift position detector 80 detects a parking position, when the push-button 66 of the operating portion 64 is pushed, the control unit 71 moves back to the OFF (LOCK) position.

The vibration sensor 73 detects a vibration applied to the casing 16 in at least one of, both in the present embodiment, cases where the engine is operated and where the vehicle is running. In a state where the vibration sensor 73 is detecting a vibration, the control unit 71 is prohibited from operating the electric motor 33 to cause the lock plate 30 to slide in a direction to engage with the steering shaft 12. Therefore, the lock plate 30 never slides to the side for engaging with the steering shaft 12, even if the push-button 66 of the operating portion 64 is erroneously pushed when the vehicle is traveling, as well as when the vehicle is stopped but the engine is operated and when the engine is stopped with the vehicle being running.

Next, the operation of the first embodiment will be described below. The planetary gear mechanism 34 is housed in the casing 16, and reduces rotation speed of the electric motor 33 and transmits the rotation speed to the rotation member 32. The planetary gear mechanism includes: a first sun gear 40 coaxially coupled to an output shaft 38 of the electric motor 33 in a relatively non-rotatable manner; a plurality of first planetary gears 41 meshed with the first sun gear 40; a ring gear 43 which is fixed to the casing 16 and has inner teeth 42 to be meshed with the first planetary gears 41; a first carrier 44 for rotatably supporting the plurality of the first planetary gears 41; a second sun gear 45 disposed coaxially with the first sun gear 40 and coupled to the first carrier 44 in a relatively non-rotatable manner; a plurality of second planetary gears 46 meshed with the second sun gear 45 and the inner teeth 42; a second carrier 47 which rotatably supports the second planetary gears 46 and is coupled to one end of the rotation member 32 in a relatively non-rotatable manner; and a shaft 53 whose opposite ends are coaxially coupled to the first sun gear 40 and the rotation member 32 respectively in a relatively rotatable manner, the first carrier 44 and the second sun gear 45 being supported on the shaft 53 in a relatively rotatable manner.

That is, in the planetary gear mechanism 34, a first reduction in speed is conducted between the first sun gear 40 and the first carrier 44, and a second reduction in speed is conducted between the second sun gear 45 non-relatively rotatable with the first carrier 44 and the second carrier 47, so that the rotation speed of the electric motor 33 is sufficiently reduced and transmitted to the rotation member 32, thereby driving the locking member 32 to slide with a sufficient speed. Also, the ring gear 43 of the planetary gear mechanism 34 is a single component commonly used in the first and second reductions in speed, thereby avoiding an increase in the number of components and the size of the planetary gear mechanism 34.

Also, the ignition switch 35 is housed in the casing 16, and changes switching modes in response to rotation of the rotation member 32; and the operation switch 68 for issuing a command to the control unit 71 which is housed in the casing 16 to control operation of the electric motor 33. Therefore, the operation of the operation switch 68 controls the operation of the electric motor 33, so that the locking plate 30 is driven between a steering locked state and a steering unlocked state, and also the switching modes of the ignition switch 35 are changed. The reduction in speed between the electric motor 33 and the rotation member 32 is conducted by the planetary gear mechanism 34, and the planetary gear mechanism 34 is housed in the casing 16, so that the size of the casing 16 is not increased in the radial direction of the planetary gear mechanism, and also is not increased beyond the size of the conventional steering lock system using a mechanical key. Thus, it is possible to use, in the same type of vehicle, either the electric steering lock system 15 having the operation switch 68 and the ignition switch 35 or a conventional steering lock system using a mechanical key.

Further, the control substrate 70 is housed in and fixed to the casing 16; the control unit 71 disposed on the control substrate 70 to control operation of the electric motor 33; and the vibration sensor 73 for detecting a vibration generated in the casing 16 in at least one, both in the present invention, of cases where the engine is operated and where the vehicle is running, and when the vibration sensor 73 detects a vibration, the control unit 71 is prohibited from controlling the electric motor 33 to operate the locking plate 30 to slide in a direction to engage with the steering shaft 12. Therefore, this arrangement provides a fail safe function which prohibits the locking plate from sliding when the vehicle is running. Also, the vibration sensor 73 is mounted on the control substrate 70 which is housed in and fixed to the casing 16 and on which also the control unit 71 is mounted, thereby eliminating wiring for inputting a signal indicating a vehicle running state, from outside of the casing 16, to the control unit 71 to simplify the structure of the electric steering lock system 15, and facilitating an assembly thereof.

Figure 8:
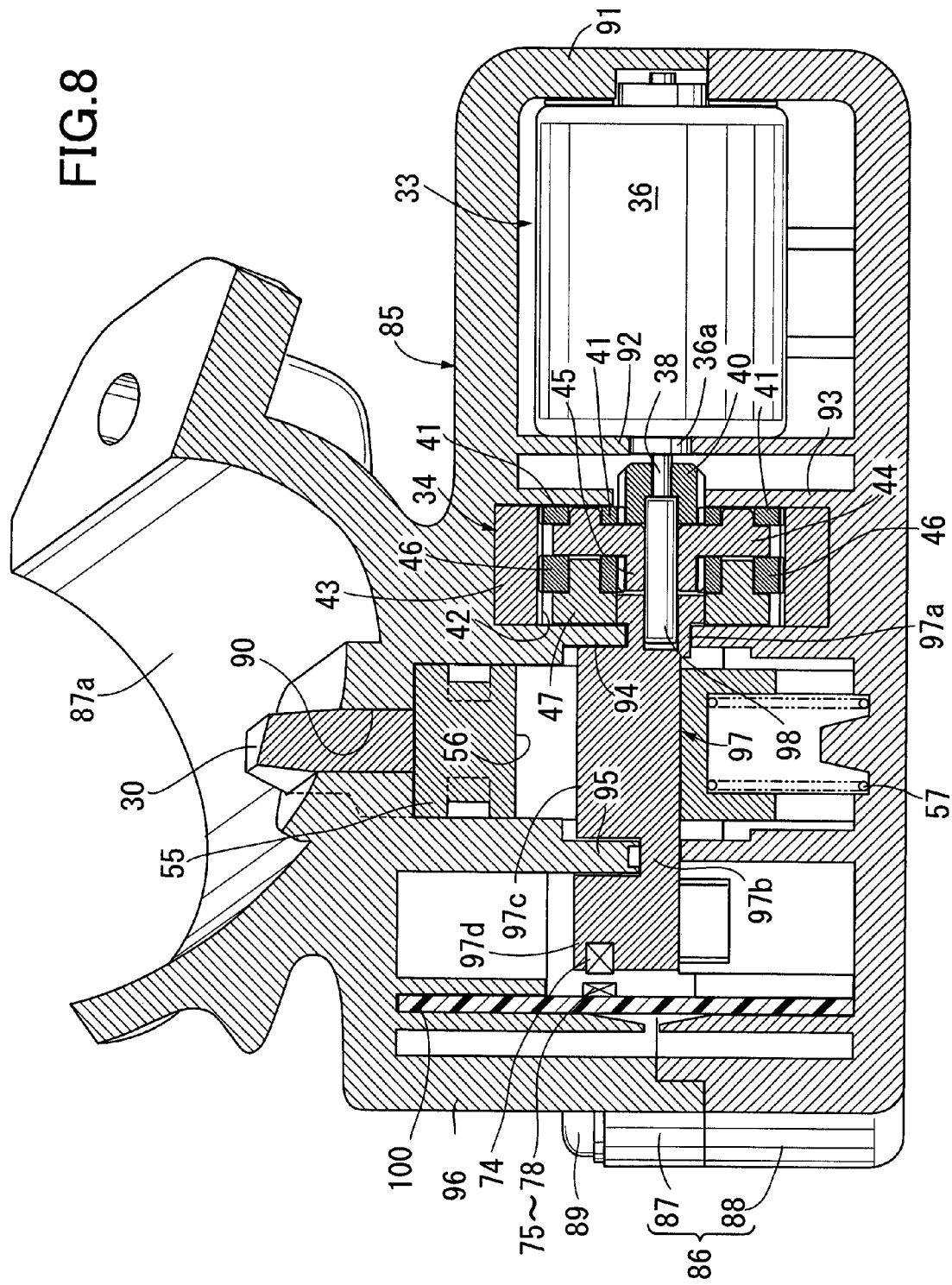
FIG. 8 is a sectional of an electric steering lock system according to a second embodiment of the present invention view, corresponding to FIG. 4.

FIG. 8 shows a second embodiment of the present invention. The parts corresponding to those of the first embodiment are designated by the same reference numerals and shown in FIG. 8. Thus, a detailed description thereof is omitted.

An electric steering lock system 85 includes a casing 86 having a casing main body 87 and a cover 88 which are fastened to each other by a plurality of screw members 89. A slide hole 90 is provided at a central portion in the circumferential direction of an arcuate mount portion 87a of the casing main body 87 which is mounted to the steering column 11 (see the first embodiment shown in FIGS. 1 to 7).

The casing 86 has a one-end wall 91, first to fourth bulkheads 92 to 95, and an other-end wall 96 which are arranged sequentially from one end of the casing 86 (from the right end of FIG. 8) with spaces provided therebetween in the longitudinal direction of the casing 16. The one-end wall 91, the first to fourth bulkheads 92 to 95, and the other-end wall 96 are formed in cooperation between the casing main body 87 and the cover 88.

The casing 86 houses therein a rotation member 97 which operates the lock plate 30 to slide in response to its rotation, the electric motor 33, the planetary gear mechanism 34 which reduces rotation speed of the electric motor 33 and transmits the rotation speed to the rotation member 97.

The electric motor 33 includes a motor housing 36 which is housed in and fixed to the casing 86 at a position between the one end wall 91 and the first bulkhead 92. The planetary gear mechanism 34 is housed in and fixed to the casing 86 at a position between the third bulkhead 93 and the fourth bulkhead 94. The planetary gear mechanism 34 includes: a first sun gear 40 coaxially coupled to the output shaft 38 of the electric motor 33 in a relatively non-rotatable manner; a plurality of, for example a pair of, first planetary gears 41 meshed with the first sun gear 40; a ring gear 43 which is fixed to the casing 86 and has inner teeth 42 to be meshed with the first planetary gears 41; a first carrier 44 for rotatably supporting the plurality of the first planetary gears 41; a second sun gear 45 disposed coaxially with the first sun gear 40 and connected to the first carrier 44 in a relatively non-rotatable manner; a plurality of, for example a pair of, second planetary gears 46 which are meshed with the second sun gear 45 and the inner teeth 42; and a second carrier 47 which rotatably supports the second planetary gears 46 and is coupled to one end of the rotation member 97 in a relatively non-rotatable manner.

A slider 55 is housed in the casing 16 at a position between the third bulkhead 94 and the fourth bulkhead 95. The slider 55 is coupled to a lock plate 30 which is slidably fitted in the slide hole 90 so that the slider 55 can slide in the sliding direction of the lock plate 30. The slider 55 has an opening 56 through which the rotation member 97 passes.

The rotation member 97 integrally includes a first shaft portion 97*a*, a second shaft portion 97*b* and a lift cam portion 97*c*. The first shaft portion 97*a* rotatably passes through the third bulkhead 94. The second shaft portion 97*b* is coaxial with the first shaft portion 97*a*, and rotatably passes through the fourth bulkhead 95. The lift cam portion 97*c* provides connection between the first shaft portion 97*a* and the second shaft portion 97*b*, and passes through the opening 56 in the slider 55. A spring 57 is interposed under compression between the cover 88 and the slider 55 in the casing 86. The spring 57 urges the slider 55 to bring the inner surface of the opening 56 into contact with the lift cam portion 97*c* on the side opposite to the lock plate 30.

In addition, one end of the first shaft portion 97*a* of the rotation member 97 is connected to the central portion of the second carrier 47 of the planetary gear mechanism 34 in a relatively non-rotatably manner, whereby rotation power output from the electric motor 33 is reduced by the planetary gear mechanism 34, and then transmitted to the rotation member 97.

Further, the first sun gear 40 and the first shaft portion 97*a* of the rotation member 97 are fitted with the opposite ends of the coaxial shaft 98 respectively in a relatively rotatable manner, so that the shaft 98 supports the first carrier 44 and second sun gear 45 in a relatively rotatable manner. That is, the first carrier 44 and second sun gear 45 are supported in a relatively rotatable manner by the shaft 98 whose opposite ends are coaxially coupled to the first sun gear 40 and the rotation member 97 respectively in a relatively rotatable manner.

A control substrate 100 is housed in and fixed to the casing 86 at a position between the fourth bulkhead 95 and the other-end wall 96. The control substrate 100 includes: a control unit (not shown) as in the case of the first embodiment; a motor drive circuit (not shown) for driving the electric motor 33 in response to a control signal from the control unit; and a vibration sensor for detecting a vibration generated in the casing 86 in at least one of cases where the engine is started and where vehicle is running, and when the vibration sensor detects a vibration, the control unit is prohibited from controlling the electric motor 33 to cause the lock plate 30 to slide to be locked.

An arm portion 97*d* is integrally provided at one end, opposed to the control substrate 100, of the second shaft portion 97*b* of the rotation member 97. The arm portion 32*d* extends outwards from the second shaft portion 97*b* in the radial direction. A magnet 74 is mounted at the tip end of arm portion 97*d* so as to face the control substrate 100. Four hall elements 75 to 78 are disposed on the control substrate 100. The hall elements 75 to 78 detect an operation position of the electric motor 33, that is, an OFF (LOCK) position, an ACC position, an ON position, or a ST position, by detecting the position of the magnet 74 in response to the rotation of the rotation member 97 caused by the operation of the electric motor 33.

The electric steering lock system 85 is used as one function of a smart entry system. When a legitimate user is identified, the electric motor 33 is operated to be unlocked by the control unit. When the legitimate user gets off the vehicle, the doors of the vehicle are locked, and the electric motor 33 is concurrently operated to be locked by the control unit.

Also in the second embodiment, as in the first embodiment, the planetary gear mechanism 34 enables the first reduction in speed to be conducted between the first sun gear 40 and the first carrier 44, and the second reduction in speed to be conducted between the second sun gear 45 relatively non-rotatable with the first carrier 44 and the second carrier 47, so that rotation speed of the electric motor 33 is sufficiently reduced and transmitted to the rotation member 97, thereby driving the locking plate 30 to slide with a sufficient speed, and avoiding an increase in the number of components and the size of the planetary gear mechanism 34.

Also, in order to provide a fail safe function which prohibits the electric motor 33 from operating to be locked when the vehicle is running, there is no need to provide wiring for inputting a signal detecting at least one of states of the engine operation and the vehicle running to simplify the structure of the electric steering lock system 85, and facilitating an assembly thereof.

The embodiments of the present invention have been described above, but the present invention should not be limited thereto, and various changes in design may be made without departing from the subject matter of the present invention.

What is claimed is:

1. An electric steering lock system comprising:
    a casing mounted to a steering column;
    a locking member slidably supported in the casing between a position for engaging the casing with a steering shaft and a position for disengaging the casing from the steering shaft;
    a rotation member for operating the locking member to slide in response to rotation thereof;
    an electric motor; and
    a planetary gear mechanism for reducing the rotation speed of the electric motor and transmitting the rotation speed to the rotation member,
    wherein the planetary gear mechanism includes:
        a first sun gear coaxially coupled to an output shaft of the electric motor in a relatively non-rotatable manner;
        a plurality of first planetary gears meshed with the first sun gear;
        a ring gear which is fixed to the casing and has inner teeth to be meshed with the first planetary gears;
        a first carrier for rotatably supporting the plurality of the first planetary gears;
        a second sun gear disposed coaxially with the first sun gear and coupled to the first carrier in a relatively non-rotatable manner;
        a plurality of second planetary gears meshed with the second sun gear and the inner teeth;
        a second carrier which rotatably supports the second planetary gears and is coupled to one end of the rotation member in a relatively non-rotatable manner; and
        a coaxial shaft whose opposite ends are coaxially coupled to the first sun gear and the rotation member respectively in a relatively rotatable manner, the first carrier and the second sun gear being supported on the coaxial shaft in a relatively rotatable manner, and
    wherein the first sun gear encompasses adjoining ends of the output shaft and coaxial shaft.

2. The electric steering lock system according to claim 1, further comprising:
    an ignition switch which is housed in the casing and changes switching modes in response to rotation of the rotation member; and an operation switch which is attached to the casing to issue a command to a control unit housed in the casing to control operation of the electric motor.

3. The electric steering lock system according to claim 1 or 2, further comprising:

a control substrate housed in and fixed to the casing;

a control unit disposed in the control substrate to control the operation of the electric motor; and a vibration sensor for detecting a vibration generated in the casing in at least one of the cases where an engine is operated or where a vehicle is running, wherein when the vibration sensor detects a vibration, the control unit is prohibited from controlling the electric motor to operate the locking member to slide in a direction to engage with the steering shaft.

\* \* \* \* \*